(12) United States Patent
Kondo

(10) Patent No.: US 9,403,971 B2
(45) Date of Patent: Aug. 2, 2016

(54) RUBBER COMPOSITION FOR TREAD, AND PNEUMATIC TIRE

(75) Inventor: Toshikazu Kondo, Kobe (JP)

(73) Assignee: SUMITOMO RUBBER INDUSTRIES, LTD., Kobe-Shi (JP)

( * ) Notice: Subject to any disclaimer, the term of this patent is extended or adjusted under 35 U.S.C. 154(b) by 73 days.

(21) Appl. No.: 14/005,798

(22) PCT Filed: Apr. 3, 2012

(86) PCT No.: PCT/JP2012/059112
§ 371 (c)(1),
(2), (4) Date: Sep. 17, 2013

(87) PCT Pub. No.: WO2012/165038
PCT Pub. Date: Dec. 6, 2012

(65) Prior Publication Data
US 2014/0011944 A1    Jan. 9, 2014

(30) Foreign Application Priority Data

May 30, 2011    (JP) ................. 2011-120780

(51) Int. Cl.
| | | |
|---|---|---|
| *C08L 9/06* | (2006.01) | |
| *B60C 1/00* | (2006.01) | |
| *C08L 9/00* | (2006.01) | |
| *C08L 15/00* | (2006.01) | |
| *C08K 3/04* | (2006.01) | |
| *C08K 3/36* | (2006.01) | |

(52) U.S. Cl.
CPC ................. *C08L 9/06* (2013.01); *B60C 1/0016* (2013.04); *C08L 9/00* (2013.01); *C08L 15/00* (2013.01); *C08K 3/04* (2013.01); *C08K 3/36* (2013.01); *Y02T 10/862* (2013.01)

(58) Field of Classification Search
CPC ............. C08L 9/06; C08L 9/00; C08L 15/00; C09K 3/0033; C08K 3/04; C08K 3/36; Y02T 10/862; B60C 1/0016
USPC ........................................ 524/526
See application file for complete search history.

(56) References Cited

U.S. PATENT DOCUMENTS

| | | | | |
|---|---|---|---|---|
| 7,691,957 | B2 * | 4/2010 | Suzuki et al. ............. | 526/340.4 |
| 2005/0171267 | A1 | 8/2005 | Zanzig et al. | |
| 2008/0169053 | A1 * | 7/2008 | Nakamura ................. | 152/209.5 |
| 2009/0137718 | A1 * | 5/2009 | Hirabayashi .................. | 524/496 |
| 2010/0108213 | A1 * | 5/2010 | Miyazaki ................... | 152/209.5 |
| 2010/0186868 | A1 | 7/2010 | Sandstrom et al. | |
| 2010/0204372 | A1 | 8/2010 | Miyazaki | |
| 2010/0224299 | A1 | 9/2010 | Miyazaki | |
| 2011/0112212 | A1 | 5/2011 | Kimura et al. | |
| 2012/0016056 | A1 * | 1/2012 | Miyazaki ...................... | 523/156 |

FOREIGN PATENT DOCUMENTS

| | | |
|---|---|---|
| CN | 1663993 A | 9/2005 |
| CN | 101889050 A | 11/2010 |
| EP | 0 270 071 A2 | 6/1988 |
| EP | 1 637 548 A1 | 3/2006 |
| EP | 2 184 317 A1 | 5/2010 |
| EP | 2 223 959 A1 | 9/2010 |
| JP | 06-53768 B2 | 7/1994 |
| JP | 2003-514078 B2 | 4/2003 |
| JP | 2005-314533 A | 11/2005 |
| JP | 2006-063285 A | 3/2006 |
| JP | 2006-104455 A | 4/2006 |
| JP | 2007-262206 A | 10/2007 |
| JP | 2007-326942 A | 12/2007 |
| JP | 2008019334 A * | 1/2008 |
| JP | 2009-263587 A | 11/2009 |
| JP | 2010-111753 A | 5/2010 |
| JP | 2010-209255 A | 9/2010 |
| JP | 2010-241982 A | 10/2010 |
| JP | 2011-116823 A | 6/2011 |
| JP | 2011-122024 A | 6/2011 |
| JP | 2011-122062 A | 6/2011 |
| JP | 2011-132307 A | 7/2011 |
| JP | 2011-144262 A | 7/2011 |
| JP | 2011-144323 A | 7/2011 |
| JP | 2012-52028 A | 3/2012 |
| WO | WO 2005000921 A1 * | 1/2005 |
| WO | WO 2008/044722 A1 | 4/2008 |

OTHER PUBLICATIONS

JP 2008-019334 A, machine translation, Japan Platform for Patent Information (J-PlatPat) (2008).*

* cited by examiner

*Primary Examiner* — Susannah Chung
*Assistant Examiner* — Josephine Chang
(74) *Attorney, Agent, or Firm* — Birch, Stewart, Kolasch & Birch, LLP

(57) ABSTRACT

Rubber composition for a tread, which enables not only improving handling stability, abrasion resistance, and fuel economy in a balanced manner, but also improving wet grip performance and processability in a balanced manner, in a pneumatic tire formed from the rubber composition. The rubber composition comprises a terminally-modified solution-polymerized styrene-butadiene rubber, a butadiene rubber synthesized in the presence of a rare earth catalyst, and a particular type of reinforcing agent.

4 Claims, No Drawings

RUBBER COMPOSITION FOR TREAD, AND PNEUMATIC TIRE

TECHNICAL FIELD

The present invention relates to a rubber composition for a tread, and a pneumatic tire comprising a tread formed therefrom.

BACKGROUND ART

For the purpose of global environmental protection, it has been promoted to improve fuel economy of automobiles. Thus, automobile tires having less rolling resistance are also desired.

Rolling resistance of a tire is largely attributable to by energy loss caused by the repeated deformation of the tire during running. In order to reduce rolling resistance, it is suggested that, for example, a rubber tread portion, which more largely contributes to rolling resistance than any other tire component, be formed to have a two-layer structure in which a rubber composition with small energy loss is provided on the inner side (base tread) and a rubber composition excellent in abrasion resistance is provided on the outer side (cap tread).

Generally, reducing the energy loss of a cap tread rubber causes the problems of reduced grip performance, poor abrasion resistance and poor cut and chip resistance. Further, in the case of using a modified polymer for silica formulations to reduce the energy loss, a large amount of the polymer deteriorates processability. Also if the amount of reinforcing agent is reduced to reduce the energy loss, then the rigidity tends to be reduced and the handling stability (handling performance) tends to be deteriorated. As described above, it is difficult for a cap tread rubber to improve in handling stability, abrasion resistance, and fuel economy in a balanced manner, and it is also difficult to obtain a good balance of wet grip performance and processability.

For example, Patent Literature 1 discloses a rubber composition including a modified styrene-butadiene rubber, silica, and the like so as to improve properties such as fuel economy. However, it still has room for improvement in the properties described above in a balanced manner.

CITATION LIST

Patent Literature

Patent Literature 1: JP 2010-111753 A

SUMMARY OF INVENTION

Technical Problem

The present invention aims to solve the above problems and provide a rubber composition for a tread which enables not only to improve handling stability, abrasion resistance, and fuel economy in a balanced manner, but also to improve wet grip performance and processability in a balanced manner, and a pneumatic tire formed from the rubber composition.

Solution to Problem

The present invention relates to a rubber composition for a tread, comprising: a terminally-modified solution-polymerized styrene-butadiene rubber; a butadiene rubber synthesized in the presence of a rare earth catalyst; and a reinforcing agent.

A rubber component of the rubber composition preferably contains, based on 100% by mass of the rubber component, 10 to 70% by mass of the terminally-modified solution-polymerized styrene-butadiene rubber and 5 to 30% by mass of the butadiene rubber synthesized in the presence of a rare earth catalyst. The reinforcing agent preferably comprises 3 to 20 parts by mass of carbon black and 30 to 100 parts by mass of silica, each per 100 parts by mass of the rubber component.

In the rubber composition, the rubber component preferably contains, based on 100% by mass of the rubber component, 10 to 40% by mass of a styrene-butadiene rubber having a styrene content of 20% by mass or more, a weight average molecular weight (Mw) of 800,000 or more, and a ratio of weight average molecular weight to number average molecular weight (Mw/Mn) of 0.9 to 2.5.

The rubber composition preferably comprises, per 100 parts by mass of the rubber component, 1 to 8 parts by mass of an aromatic vinyl polymer polymerized from at least one of α-methylstyrene and styrene.

In the rubber composition, an amount of the reinforcing agent and an acetone-extractable content preferably satisfy the following relation:

$$3.0 \leq [(\text{the amount of the reinforcing agent})/(\text{the acetone-extractable content})] \leq 10.0.$$

The present invention also relates to a pneumatic tire, comprising a tread formed from the rubber composition.

Advantageous Effects of Invention

Since the rubber composition for a tread according to the present invention comprises a terminally-modified solution-polymerized styrene-butadiene rubber, a butadiene rubber synthesized in the presence of a rare earth catalyst, and a reinforcing agent, handling stability, abrasion resistance, and fuel economy can be improved in a balanced manner. Also, the addition of a styrene-butadiene rubber having a high styrene content and a specific weight average molecular weight improves these properties and wet grip performance in a balanced manner. The further addition of a specific aromatic vinyl polymer improves the foregoing properties and processability in a balanced manner. Therefore, the present invention enables to provide a pneumatic tire having an excellent balance of the foregoing properties.

DESCRIPTION OF EMBODIMENTS

The rubber composition for a tread of the present invention comprises a terminally-modified solution-polymerized styrene-butadiene rubber (hereinafter, also referred to as "modified SBR"), a butadiene rubber synthesized in the presence of a rare earth catalyst (hereinafter, also referred to as "rare earth BR"), and a reinforcing agent.

The use of a reinforcing agent in combination with the modified SBR and the rare earth BR improves the balance of the properties of handling stability (handling performance), abrasion resistance, and fuel economy, and this improvement is synergistic. Also, the further addition of an SBR having a high styrene content and a specific Mw enhances wet grip performance without deteriorating fuel economy. Thus, handling stability, abrasion resistance, and fuel economy as well as wet grip performance can be improved in a balanced manner. Meanwhile, there is a concern that kneading processability would be deteriorated; however, the further addition of a specific aromatic vinyl polymer provides good kneading processability and further improves wet grip performance. Therefore, all of the above-described properties can be improved in a balanced manner.

In the composition containing the modified SBR, the rare earth BR, a reinforcing agent, oil, and the like, the balance of the above-described properties can be remarkably improved by adjusting the ratio of the amount of the reinforcing agent such as carbon black and silica to the acetone-extractable content such as the oil content to fall within a predetermined range.

The modified SBR can be prepared by reaction between a modifier and an active end (polymerizing end) of SBR obtained by solution polymerization, and the modifier serves to interact with silica. The modified SBR may suitably be, for example, one modified with a compound represented by the following formula (1) as described in JP 2010-111753 A.

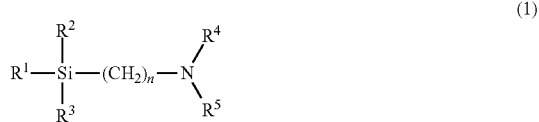

In the formula, $R^1$, $R^2$, and $R^3$ are the same as or different from each other and each represent an alkyl group, an alkoxy group (preferably a C1 to C8, more preferably C1 to C6, and still more preferably C1 to C4 alkoxy group), a silyloxy group, an acetal group, a carboxyl group (—COOH), a mercapto group (—SH), or a derivative thereof; $R^4$ and $R^5$ are the same as or different from each other and each represent a hydrogen atom or an alkyl group (preferably a C1 to C4 alkyl group); and n represents an integer (preferably of 1 to 5, more preferably 2 to 4, and still more preferably 3).

$R^1$, $R^2$, and $R^3$ are each preferably an alkoxy group, and $R^4$ and $R^5$ are each preferably an alkyl group. This improves handling stability (handling performance), abrasion resistance, fuel economy, wet grip performance, and processability in a balanced manner.

Specific examples of the compound represented by the above formula (1) include 3-aminopropyltrimethoxysilane, 3-aminopropyltriethoxysilane, 3-aminopropyldimethylmethoxysilane, 3-aminopropylmethyldimethoxysilane, 2-dimethylaminoethyltrimethoxysilane, 3-diethylaminopropyltrimethoxysilane, and 3-dimethylaminopropyltrimethoxysilane. These may be used alone, or two or more of these may be used in combination.

The modification of styrene-butadiene rubber with the compound (modifier) represented by the above formula (1) may be performed by a conventionally known method such as those described in JP H06-53768 B, JP H06-57767 B, JP 2003-514078 T and so forth. For example, the contact between styrene-butadiene rubber and a modifier is enough to modify styrene-butadiene rubber. Specific examples thereof include a method in which styrene-butadiene rubber is prepared by anionic polymerization, and a predetermined amount of a modifier is added to the resulting rubber solution so that the polymerizing end (active end) of styrene-butadiene rubber is reacted with the modifier.

The modified SBR preferably has a bound styrene content of 10% by mass or more, more preferably 20% by mass or more, in order to enhance grip performance. Meanwhile, the bound styrene content is preferably 45% by mass or less, and more preferably 40% by mass or less, in order to enhance abrasion resistance.

In the present invention, the styrene content in SBR is determined by $H^1$-NMR measurement.

The amount of the modified SBR based on 100% by mass of the rubber component is preferably 10% by mass or more, more preferably 20% by mass or more, and still more preferably 40% by mass or more. If the amount of the modified SBR is less than 10% by mass, then fuel economy may not be sufficiently enhanced. The amount of the modified SBR is preferably 70% by mass or less, and more preferably 65% by mass or less. If the amount of the modified SBR exceeds 70% by mass, the proportion of the rest of the rubber component is relative reduced and therefore the balance of the above-described properties may not be sufficiently improved.

The rare earth BR may be one generally used in the tire industry. The rare earth catalyst used in the synthesis (polymerization) of the rare earth BR may be a conventionally known rare earth catalyst and examples thereof include catalysts containing lanthanide rare earth element compounds, organoaluminum compounds, aluminoxanes, or halogen-containing compounds, optionally with Lewis bases. Nd catalysts, which contain neodymium (Nd)-containing compounds as the lanthanide rare earth element compounds, are preferred because they provide BR having a high cis content and a low vinyl content.

Examples of the lanthanide rare earth element compounds include halides, carboxylates, alcoholates, thioalcoholates, and amides of rare earth metals having atomic numbers 57 to 71. Especially, Nd catalysts are preferred because they provide BR having a high cis content and a low vinyl content as described above.

The organoaluminum compound may be a compound represented by $AlR^aR^bR^c$ wherein $R^a$, $R^b$, and $R^c$ are the same as or different from each other, and each represent hydrogen or a C1 to C8 hydrocarbon group. Examples of the aluminoxanes include acyclic aluminoxanes and cyclic aluminoxanes. Examples of the halogen-containing compounds include: aluminum halides represented by $AlX_kR^d_{3-k}$ wherein X represents a halogen, $R^d$ represents a C1 to C20 alkyl, aryl, or aralkyl group, and k represents 1, 1.5, 2, or 3; strontium halides such as $Me_3SrCl$, $Me_2SrCl_2$, $MeSrHCl_2$, and $MeSrCl_3$; and metal halides such as silicon tetrachloride, tin tetrachloride, and titanium tetrachloride. Lewis bases may be used for complexing lanthanide rare earth element compounds, and preferred examples thereof include acetylacetone, ketones, and alcohols.

In the polymerization of butadiene, the rare earth catalyst may be used as a solution in an organic solvent (such as n-hexane, cyclohexane, n-heptane, toluene, xylene, or benzene), or may be supported on an appropriate carrier such as silica, magnesia, or magnesium chloride before use. With respect to the polymerization conditions, either solution polymerization or bulk polymerization is applicable, and the polymerization temperature is preferably in the range of −30° C. to 150° C. The polymerization pressure may be appropriately set depending on other conditions.

The rare earth BR preferably has a Mooney viscosity $ML_{1+4}$ (100° C.) of 35 or higher, more preferably 40 or higher. A Mooney viscosity of lower than 35 may cause the unvulcanized rubber composition to have a low viscosity and may thereby fail to secure a proper thickness of the vulcanizate. The rare earth BR preferably has a Mooney viscosity of 55 or lower, more preferably 50 or lower. If the Mooney viscosity exceeds 55, the unvulcanized rubber composition may become so hard that it is difficult to form an extrudate with smooth edges.

The Mooney viscosity used herein is determined in conformity with IS0289 or JIS K6300.

The rare earth BR preferably has a ratio (Mw/Mn) of weight average molecular weight (Mw) to number average molecular weight (Mn) of 1.2 or higher, more preferably 1.5 or higher. If Mw/Mn is lower than 1.2, then processability tends to be deteriorated. The Mw/Mn is preferably 5 or lower, and more preferably 4 or lower. If Mw/Mn exceeds 5, then fuel economy is less likely to be improved.

The Mw of the rare earth BR is preferably 300,000 or more, and more preferably 480,000 or more. Also, the Mw is preferably 1,000,000 or less, and more preferably 800,000 or less. The Mn of the rare earth BR is preferably 100,000 or more, and more preferably 150,000 or more. Also, the Mn is preferably 600,000 or less, and more preferably 400,000 or less. If Mw or Mn is less than its lower limit, then fuel economy, abrasion resistance, handling stability, and wet grip performance tend to be deteriorated. If Mw or Mn exceeds its upper limit, then processability tends to be deteriorated.

In the present description, Mw and Mn are determined from values measured using a gel permeation chromatograph (GPC) (GPC-8000 series produced by TOSOH CORPORATION, detector: differential refractometer, column: TSKgel SuperMaltpore HZ-M produced by TOSOH CORPORATION) relative to polystyrene standards.

The rare earth BR preferably has a cis content of 90% by mass or more, more preferably 93% by mass or more, and still more preferably 95% by mass or more. If the cis content is less than 90% by mass, then fuel economy may not be sufficiently improved.

The rare earth BR preferably has a vinyl content of 0.9% by mass or less, more preferably 0.8% by mass or less. If the vinyl content exceeds 0.9% by mass, then fuel economy, abrasion resistance, handling stability, and wet grip performance tend to be deteriorated.

In the present invention, the vinyl content (1,2-butadiene unit content) and the cis content (cis-1,4-butadiene unit content) can be determined by infrared absorption spectrum analysis.

The amount of the rare earth BR based on 100% by mass of the rubber component is preferably 5% by mass or more, more preferably 10% by mass or more, and still more preferably 15% by mass or more. If the amount is less than 5% by mass, then fuel economy may not be sufficiently enhanced. The amount of the rare earth BR is preferably 30% by mass or less, and more preferably 27% by mass or less. If the amount exceeds 30% by mass, the proportion of the rest of the rubber component is relatively reduced and therefore the balance of the above-described properties may not be sufficiently improved.

The rubber component in the present invention preferably further contains a styrene-butadiene rubber (hereinafter, also referred to as "high-styrene SBR (linear polymer type)") having a styrene content of 20% by mass or more, a weight average molecular weight (Mw) of 800,000 or more, and a ratio of weight average molecular weight to number average molecular weight (Mw/Mn) of 0.9 to 2.5. This enhances wet grip performance without deteriorating fuel economy, and therefore the balance of the above-described properties can be greatly improved.

In order to improve the balance of the above-described properties effectively, the lower limit of the styrene content of the high-styrene SBR is preferably 25% by mass or more, and more preferably 30% by mass or more. The upper limit thereof is preferably 45% by mass or less, and more preferably 40% by mass or less.

The Mw of the high-styrene SBR is preferably 900,000 or more, and more preferably 1,000,000 or more. If Mw is less than 800,000, then fuel economy, abrasion resistance, handling stability, and wet grip performance tend to be deteriorated. The Mw is preferably 2,500,000 or less, more preferably 2,300,000 or less, and still more preferably 2,000,000 or less. If Mw is more than 2,500,000, then processability tends to be deteriorated.

The Mw/Mn of the high-styrene SBR is preferably 0.9 to 2.0, and more preferably 1.0 to 1.5. This provides good fuel economy, abrasion resistance, handling stability, and wet grip performance.

The high-styrene SBR preferably has a vinyl content of 25% by mass or less, more preferably 20% by mass or less, and still more preferably 17% by mass or less. If the vinyl content exceeds 25% by mass, then fuel economy and abrasion resistance tend to be deteriorated. The lower limit of the vinyl content is not particularly limited, and is preferably 5% by mass or more, and more preferably 10% by mass or more.

The rubber component in the present invention may contain other diene rubbers. Examples of other diene rubbers include natural rubber (NR), epoxidized natural rubber (ENR), isoprene rubber (IR), ethylene-propylene-diene rubber (EPDM), butyl rubber (IIR), halogenated butyl rubber (X-IIR), chloroprene rubber (CR), and acrylonitrile (NBR). Other kinds of styrene-butadiene rubbers and butadiene rubbers are also applicable.

The reinforcing agent contained in the rubber composition of the present invention may be any of reinforcing fillers generally used in the tire industry, and is preferably a combination of carbon black and silica.

The carbon black and silica are not particularly limited and may be those generally used. In the case of using silica, a known silane coupling agent is preferably used in combination with silica in order to promote dispersion of silica.

The carbon black preferably has a nitrogen adsorption specific surface area ($N_2SA$) of 70 $m^2/g$ or larger, more preferably 90 $m^2/g$ or larger. If the $N_2SA$ is smaller than 70 $m^2/g$, then sufficient reinforcement may not be obtained. The nitrogen adsorption specific surface area of carbon black is preferably 140 $m^2/g$ or smaller, and more preferably 120 $m^2/g$ or smaller. If the $N_2SA$ is larger than 140 $m^2/g$, then fuel economy tends to be deteriorated.

The nitrogen adsorption specific surface area of carbon black used herein is determined in accordance with JIS K 6217-2:2001.

The amount of carbon black per 100 parts by mass of the rubber component is preferably 3 parts by mass or more, and more preferably 4 parts by mass or more. If the amount is less than 3 parts by mass, then sufficient reinforcement may not be obtained. The amount of carbon black is preferably 20 parts by mass or less, more preferably 15 parts by mass or less, and still more preferably 10 parts by mass or less. If the amount exceeds 20 parts by mass, then fuel economy tends to be deteriorated.

The silica preferably has a nitrogen adsorption specific surface area ($N_2SA$) of 100 $m^2/g$ or larger, more preferably 150 $m^2/g$ or larger. If the $N_2SA$ is smaller than 100 $m^2/g$, then sufficient reinforcement may not be obtained. The nitrogen adsorption specific surface area of silica is preferably 220 $m^2/g$ or smaller, and more preferably 190 $m^2/g$ or smaller. If the $N_2SA$ is larger than 220 $m^2/g$, then fuel economy tends to be deteriorated.

The amount of silica per 100 parts by mass of the rubber component is preferably 30 parts by mass or more, and more preferably 50 parts by mass or more. If the amount is less than 30 parts by mass, then sufficient reinforcement may not be obtained. The amount of silica is preferably 100 parts by mass or less, and more preferably 90 parts by mass or less. If the amount exceeds 100 parts by mass, then fuel economy tends to be deteriorated.

In the case of using silica and carbon black in combination, the silica content based on a total of 100% by mass of silica and carbon black is preferably 60% by mass or more, more preferably 75% by mass or more, and still more preferably 85% by mass or more. If the silica content is less than 60% by mass, then the above-described properties may not be improved in a balanced manner. The silica content is preferably 98% by mass or less.

The rubber composition of the present invention preferably further contains an aromatic vinyl polymer polymerized from α-methylstyrene and/or styrene. The addition of the aromatic vinyl polymer as well as the high-styrene SBR improves not only wet grip performance but also kneading processability.

Styrene and/or α-methylstyrene are used as aromatic vinyl monomers (units) of the aromatic vinyl polymer, and the aromatic vinyl polymer may be a homopolymer of one of these monomers or a copolymer of both of these monomers. The aromatic vinyl polymer is preferably a homopolymer of α-methylstyrene or a copolymer of α-methylstyrene and styrene because of their higher inexpensiveness, easy processability and excellent wet grip performance.

The aromatic vinyl polymer preferably has a softening point of 100° C. or lower, more preferably 92° C. or lower, and still more preferably 88° C. or lower. If the softening point exceeds 100° C., then abrasion resistance, grip performance at low temperatures, and kneading processability tend to be deteriorated. The softening point is preferably 30° C. or higher, more preferably 60° C. or higher, and still more preferably 70° C. or higher. If the softening point is lower than 30° C., then wet grip performance and kneading processability tend to be deteriorated.

As used herein, the softening point is a temperature at which a ball drops in the measurement of the softening point with a ring and ball softening point measuring apparatus according to JIS K 6220.

The weight average molecular weight (Mw) of the aromatic vinyl polymer is preferably 500 or more, and more preferably 800 or more. If Mw is less than 500, then the performance in terms of rolling resistance, wet grip performance, and kneading processability is less likely to be sufficiently improved. The weight average molecular weight of the aromatic vinyl polymer is preferably 3,000 or less, and more preferably 2,000 or less. If Mw exceeds 3,000, then abrasion resistance tends to be deteriorated and kneading processability tends not to be sufficiently improved.

The amount of the aromatic vinyl polymer per 100 parts by mass of the rubber component is preferably 1 part by mass or more, and more preferably 2 parts by mass or more. If the amount is less than 1 part by mass, then wet grip performance and kneading processability are less likely to be sufficiently improved. The amount of the aromatic vinyl polymer is preferably 8 parts by mass or less, and more preferably 7 parts by mass or less. If the amount exceeds 8 parts by mass, then the performance in terms of rolling resistance, handling stability, and abrasion resistance tends to be deteriorated.

The rubber composition of the present invention may optionally include compounding agents which are commonly used in the preparation of a rubber composition, such as zinc oxide, stearic acid, antioxidants, softening agents such as oil, wax, sulfur, and vulcanization accelerators, in addition to the above components.

The rubber composition of the present invention can be prepared by a usual method. Specifically, for example, the rubber composition can be prepared by mixing the components mentioned above with, for example, a Banbury mixer, a kneader, or an open roll mill, and then vulcanizing the resultant mixture.

The thus obtained rubber composition of the present invention preferably has an acetone-extractable content of 20% by mass or less, more preferably 17% by mass or less. If the acetone-extractable content exceeds 20% by mass, then rigidity tends to be reduced and thus handling stability tends to be deteriorated. The acetone-extractable content is preferably 2% by mass or more, and more preferably 4% by mass or more. If the acetone-extractable content is less than 2% by mass, the rubber composition tends to become so hard that abrasion resistance and the like can be deteriorated.

The acetone-extractable content used herein can be measured by the method described in the examples below.

In the rubber composition of the present invention, the amount (% by mass) of the reinforcing agent and the acetone-extractable content (% by mass) preferably satisfy the following relation: 3.0≤[(the amount of the reinforcing agent)/(the acetone-extractable content)]≤10.0. This improves the above-described properties in a balanced manner. The minimum value of the ratio in the relation is preferably 3.5 or higher, and more preferably 4.0 or higher. The maximum value of the ratio is preferably 9.0 or lower, and more preferably 8.5 or lower.

The rubber composition of the present invention is used in a tread. For example, it can be suitably used in a cap tread including a cap tread and a base tread. The tread including a cap tread and a base tread can be prepared by a known method. Examples thereof include a method in which rubber composition sheets are laminated into a predetermined shape, and a method in which a rubber composition is fed into an extruder with two or more screws to form a two-layer extrudate at a head outlet of the extruder.

The pneumatic tire of the present invention can be formed from the rubber composition by a usual method. Specifically, the unvulcanized rubber composition, in which additives are compounded according to necessity, is extruded into the shape of a tread, and then arranged in a usual manner and assembled with other tire components in a tire building machine to form an unvulcanized tire. The unvulcanized tire is heated and pressurized in a vulcanizer to produce a pneumatic tire.

The pneumatic tire of the present invention can be suitably used for passenger vehicles, and trucks and buses.

EXAMPLES

The present invention is more specifically described with reference to examples, but the present invention is not limited to the examples.

In the following, the chemical agents used in examples and comparative examples are listed.

Modified SBR 1 (HPR355): HPR355 (modified S-SBR (coupled and terminated with an alkoxysilane; $R^1, R^2, R^3$=—$OCH_3$; $R^4, R^5$=H; n=3), styrene content: 28% by mass, vinyl content: 56% by mass) produced by JSR Corporation Modified SBR 2: modified styrene-butadiene rubber (vinyl content: 57% by mass, styrene content: 25% by mass; $R^1, R^2, R^3$=—$OCH_3$; $R^4, R^5$=—$CH_2CH_3$; n=3) produced by Sumitomo Chemical Co., Ltd.

Modified SBR 3: modified styrene-butadiene rubber (vinyl content: 57% by mass, styrene content: 25% by mass; $R^1$, $R^2$, $R^3$=–$OC_2H_5$; $R^4$, $R^5$=—$CH_2CH_3$; n=3) produced by Sumitomo Chemical Co., Ltd.

Non-modified SBR (T3830): T3830 (styrene content: 33% by mass, vinyl content: 34% by mass, Mw: 950,000, Mn: 370,000, Mw/Mn: 2.6) produced by Asahi Kasei Chemicals Corp.

Non-modified SBR (SLR6430): SLR6430 (high-styrene SBR of linear polymer type, styrene content: 40% by mass, vinyl content: 14% by mass, Mw: 2,000,000, Mn: 1,900,000, Mw/Mn: 1.05) produced by The Dow Chemical Company BR: BR150B produced by UBE INDUSTRIES, LTD.

Nd-BR 1: BUNA-CB24 (BR synthesized in the presence of a Nd catalyst, cis content: 96% by mass, vinyl content: 0.7% by mass, $ML_{1+4}$ (100° C.): 45, Mw/Mn: 2.69, Mw: 500,000, Mn: 186,000) produced by LANXESS Nd-BR 2: BR730 (BR synthesized in the presence of a Nd catalyst, cis content: 96.6% by mass, vinyl content: 0.8% by mass, $ML_{1+4}$ (100° C.): 51, Mw/Mn: 1.9, Mw: 577,000, Mn: 307,000) produced by JSR Corporation Carbon black: Diablack I (N220, $N_2SA$: 114 m²/g) produced by Mitsubishi Chemical Corp.

Silica: ULTRASIL VN3 (average primary particle size: 15 nm, $N_2SA$: 175 m²/g) produced by Evonik Degussa Silane coupling agent: Si266 produced by Evonik Degussa Aromatic vinyl polymer: SYLVARES SA85 (copolymer of α-methylstyrene and styrene, softening point: 85° C., Mw: 1,000) produced by Arizona Chemical Aromatic oil: Process X-140 produced by JX Nippon Oil & Energy Corporation Wax: Sunnoc N produced by OUCHI SHINKO CHEMICAL INDUSTRIAL CO., LTD.

Antioxidant: Antigene 6C (N-(1,3-dimethylbutyl)-N'-phenyl-p-phenylenediamine) produced by Sumitomo Chemical Co., Ltd.

Stearic acid: Stearic Acid "Tsubaki" produced by NOF CORP.

Zinc oxide: Zinc oxide #1 produced by MITSUI MINING & SMELTING CO., LTD.

Sulfur: sulfur powder produced by Karuizawa Iou K.K.

Vulcanization accelerator NS: NOCCELER NS (N-tert-butyl-2-benzothiazolylsulfenamide) produced by OUCHI SHINKO CHEMICAL INDUSTRIAL CO., LTD.

Vulcanization accelerator M: NOCCELER M (2-mercaptobenzothiazole) produced by OUCHI SHINKO CHEMICAL INDUSTRIAL CO., LTD.

Vulcanization accelerator DPG: NOCCELER D (N,N'-diphenylguanidine) produced by OUCHI SHINKO CHEMICAL INDUSTRIAL CO., LTD.

EXAMPLES AND COMPARATIVE EXAMPLES

According to each composition shown in Tables 1 to 5, the chemicals except sulfur and vulcanization accelerators were kneaded using a 1.7-L Banbury mixer produced by KOBE STEEL, LTD. Then, the sulfur and the vulcanization accelerators were added and kneaded with the obtained kneaded mixture using an open roll mill, whereby an unvulcanized rubber composition was obtained. The obtained unvulcanized rubber composition was press-vulcanized in a 2-mm-thick mold at 150° C. for 30 minutes, thereby providing a vulcanized rubber composition (vulcanized rubber sheet).

Separately, the obtained unvulcanized rubber composition was formed into a cap tread shape in a tire building machine, assembled with other tire components, and then vulcanized at 150° C. for 30 minutes. Thus, test tires (tire size: 195/65R15) were prepared.

The obtained vulcanized rubber compositions and test tires were evaluated as follows. The results are shown in Tables 1 to 5.

(Acetone-Extractable Content)

According to a method for measuring the acetone-extractable content in conformity with JIS K 6229, the amount of acetone extractables in the vulcanized rubber composition was measured and expressed in % by mass. The acetone-extractable content is indicative of the concentration of low-molecular-weight organic compounds such as oil and wax contained in the vulcanized rubber composition. It should be noted that although JIS K6229 (1998) defines two methods, i.e., A method and B method, A method is used in the present invention.

(Hs)

The hardness (Hs) of the vulcanized rubber sheet was measured by a method in accordance with JIS K6253. The measurement was conducted at a temperature of 30° C.

(Viscoelasticity Test)

The loss tangent (tan δ) and the complex elastic modulus (E*) at 70° C. of the vulcanized rubber sheet were measured using a viscoelasticity spectrometer produced by Iwamoto Seisakusho Co., Ltd. at a frequency of 10 Hz, an initial strain of 10%, and a dynamic strain of 2%. The tan δ and the E* in each example are each expressed as an index (tan δ index, E* index) relative to that of Comparative Example 1 (=100), which was calculated according to the following formula. A smaller tan δ index indicates lower heat build-up and better fuel economy. A larger E* index indicates higher E* and a higher hardness of the rubber composition.

(tan δ index)=(tan δ of each example)/(tan δ of Comparative Example 1)×100

(E* index)=(E* of each example)/(E* of Comparative Example 1)×100

(Handling Stability (Dry Handling Performance))

A car on which the test tires were mounted was driven and sensory evaluation for steering response was performed by a test driver. The evaluation was based on the following criteria.

Excellent: The response of the car is very quick when the steering wheel is turned.

Good: The response of the car is quick when the steering wheel is turned.

Acceptable: The response of the car is slightly slow when the steering wheel is turned.

Poor: The response of the car is slow when the steering wheel is turned.

(Abrasion Resistance)

The test tires were mounted on a car. The change in the depth of grooves on the tread was measured after the car had run about 30,000 km. The running distance that makes the depth of grooves decrease by 1 mm was calculated, and the results are expressed as an index calculated according to the following formula. A larger index value indicates better abrasion resistance.

(Index of abrasion resistance)=(Running distance that makes the groove depth decrease by 1 mm in each example)/(Running distance that makes the groove depth decrease by 1 mm in Comparative Example 1)×100

(Index of Rolling Resistance (Fuel Economy))

The rolling resistance of the test tire was measured in a rolling resistance tester by running the tire with a rim of 15×6JJ at an internal pressure of 230 kPa, a load of 3.43 kN, and a speed of 80 km/h. The results are expressed as an index (index of rolling resistance) relative to that of Comparative Example 1 (=100), which was calculated according to the following formula. A smaller index of rolling resistance indicates lower rolling resistance and better fuel economy.

(Index of rolling resistance)=(Rolling resistance of each example)/(Rolling resistance of Comparative Example 1)×100

(Wet Skid Test)

The measurement was performed according to the method of ASTM E303-83 using a portable skid resistance tester produced by Stanley. The measured value is expressed as an index relative to that of Comparative Example 1 (=100), which was calculated according to the following formula. A larger index indicates better wet grip performance.

(Wet skid index)=(Measured value in each example)/(Measured value in Comparative Example 1)×100

(Kneading Processability)

The processability of the kneaded rubber composition (unvulcanized rubber composition) which had been kneaded by a Banbury mixer was evaluated using an open roll mill. The evaluation was based on the following criteria.

Excellent: The rubber composition can be easily rolled.

Good: The rubber composition has slightly poor plasticity but can be wound about a roller and rolled.

Acceptable: The rubber composition has so poor plasticity that bagging occurs during rolling.

Poor: The rubber composition has plasticity poor enough to give a ragged texture and is thus difficult to roll.

TABLE 1

|  |  | Comparative Example 1 | Comparative Example 2 | Comparative Example 3 | Comparative Example 4 | Example 1 | Example 2 | Example 3 | Example 4 | Example 5 | Example 10 |
|---|---|---|---|---|---|---|---|---|---|---|---|
| Modified SBR 1 | HPR355 | 60 | 60 | 60 | 80 | 60 | 60 | 60 | 80 | 80 | 60 |
| Modified SBR 2 |  | — | — | — | — | — | — | — | — | — | — |
| Modified SBR 3 |  | — | — | — | — | — | — | — | — | — | — |
| Non-modified SBR | T3830 | 27.5 | 27.5 | 27.5 | — | 27.5 | 27.5 | 27.5 | — | — | 27.5 |
| Non-modified SBR | SLR6430 | — | — | — | — | — | — | — | — | — | — |
| BR | BR150B | 20 | 20 | 20 | 20 | — | — | — | — | — | — |
| Nd-BR 1 | CB24 | — | — | — | — | 20 | 20 | 20 | 20 | 20 | — |
| Nd-BR 2 | BR730 | — | — | — | — | — | — | — | — | — | 20 |
| Carbon black |  | 5 | 5 | 5 | 5 | 5 | 5 | 5 | 5 | 5 | 5 |
| Silica |  | 80 | 80 | 86 | 80 | 80 | 80 | 86 | 80 | 80 | 80 |
| Silane coupling agent |  | 6.4 | 6.4 | 6.88 | 6.4 | 6.4 | 6.4 | 6.88 | 6.4 | 6.4 | 6.4 |
| Aromatic vinyl polymer |  | — | — | — | — | — | — | — | — | — | — |
| Aromatic oil |  | 12 | 2 | 5 | 3 | 12 | 2 | 5 | 3 | — | 2 |
| Wax |  | 3 | 3 | 3 | 3 | 3 | 3 | 3 | 3 | 3 | 3 |
| Antioxidant |  | 2.5 | 2.5 | 2.5 | 2.5 | 2.5 | 2.5 | 2.5 | 2.5 | 2.5 | 2.5 |
| Stearic acid |  | 2.5 | 2.5 | 2.5 | 2.5 | 2.5 | 2.5 | 2.5 | 2.5 | 2.5 | 2.5 |
| Zinc oxide |  | 3 | 3 | 3 | 3 | 3 | 3 | 3 | 3 | 3 | 3 |
| Sulfur |  | 1.4 | 1.0 | 1.0 | 1.0 | 1.4 | 1.0 | 1.0 | 1.0 | 1.0 | 1.0 |
| Vulcanization accelerator NS |  | 1.8 | 1.8 | 1.8 | 1.8 | 1.8 | 1.8 | 1.8 | 1.8 | 1.8 | 1.8 |
| Vulcanization accelerator M |  | 0.3 | 0.3 | 0.3 | 0.3 | 0.3 | 0.3 | 0.3 | 0.3 | 0.3 | 0.3 |
| Vulcanization accelerator DPG |  | 1.5 | 1.5 | 1.5 | 1.5 | 1.5 | 1.5 | 1.5 | 1.5 | 1.5 | 1.5 |
| Total |  | 226.9 | 216.5 | 225.98 | 210 | 226.9 | 216.5 | 225.98 | 210 | 207 | 216.5 |
| Acetone-extractable content (%): O |  | 12 | 8 | 9 | 5 | 12 | 8 | 9 | 5 | 4 | 8 |
| Total amount of reinforcing agents (%): F |  | 37 | 39 | 40 | 40 | 37 | 39 | 40 | 40 | 41 | 39 |
| F/O |  | 3.1 | 4.9 | 4.4 | 8.0 | 3.1 | 4.9 | 4.4 | 8.0 | 10.3 | 4.9 |
| Tire physical properties |  |  |  |  |  |  |  |  |  |  |  |
| Hs |  | 67 | 69 | 70 | 72 | 68 | 70 | 71 | 72 | 80 | 70 |
| E* index |  | 100 | 106 | 110 | 120 | 104 | 110 | 114 | 122 | 125 | 110 |
| Tan$^\delta$ index |  | 100 | 104 | 110 | 106 | 95 | 97 | 105 | 102 | 105 | 97 |
| Handling stability (dry handling) |  | Acceptable | Good | Excellent | Excellent | Good | Excellent | Excellent | Excellent | Excellent | Excellent |
| Abrasion resistance |  | 100 | 102 | 105 | 95 | 104 | 106 | 108 | 100 | 100 | 105 |
| Fuel economy |  | 100 | 104 | 108 | 104 | 95 | 96 | 103 | 100 | 105 | 96 |

TABLE 2

|  |  | Comparative Example 2 | Example 2 | Example 6 | Example 7 |
|---|---|---|---|---|---|
| Modified SBR 1 | HPR355 | 60 | 60 | 60 | 64 |
| Modified SBR 2 |  | — | — | — | — |
| Modified SBR 3 |  | — | — | — | — |
| Non-modified SBR | T3830 | 27.5 | 27.5 | — | — |
| Non-modified SBR | SLR6430 | — | — | 22 | 19 |
| BR | BR150B | 20 | — | — | — |
| Nd-BR 1 | CB24 | — | 20 | 24 | 22 |

TABLE 2-continued

| | | Comparative Example 2 | Example 2 | Example 6 | Example 7 |
|---|---|---|---|---|---|
| Nd-BR 2 | BR730 | — | — | — | — |
| Carbon black | | 5 | 5 | 5 | 5 |
| Silica | | 80 | 80 | 80 | 80 |
| Silane coupling agent | | 6.4 | 6.4 | 6.4 | 6.4 |
| Aromatic vinyl polymer | | — | — | — | — |
| Aromatic oil | | 2 | 2 | 3.5 | 3 |
| Wax | | 3 | 3 | 3 | 3 |
| Antioxidant | | 2.5 | 2.5 | 2.5 | 2.5 |
| Stearic acid | | 2.5 | 2.5 | 2.5 | 2.5 |
| Zinc oxide | | 3 | 3 | 3 | 3 |
| Sulfur | | 1 | 1 | 1 | 1 |
| Vulcanization accelerator NS | | 1.8 | 1.8 | 1.8 | 1.8 |
| Vulcanization accelerator M | | 0.3 | 0.3 | 0.3 | 0.3 |
| Vulcanization accelerator DPG | | 1.5 | 1.5 | 1.5 | 1.5 |
| Total | | 216.5 | 216.5 | 216.5 | 215.25 |
| Acetone-extractable content (%): O | | 8 | 8 | 8 | 8 |
| Total amount of reinforcing agents (%): F | | 39 | 39 | 39 | 39 |
| F/O | | 4.9 | 4.9 | 4.9 | 5.2 |
| Tire physical properties | | | | | |
| Hs | | 69 | 70 | 70 | 71 |
| E* index | | 106 | 110 | 109 | 110 |
| Tan$\delta$ index | | 104 | 97 | 98 | 96 |
| Handling stability (dry handling) | | Good | Excellent | Excellent | Excellent |
| Wet grip performance (wet skid test) | | 100 | 100 | 105 | 104 |
| Abrasion resistance | | 102 | 106 | 104 | 102 |
| Fuel economy | | 104 | 96 | 97 | 95 |

TABLE 3

| | | Comparative Example 2 | Example 2 | Example 6 | Example 8 | Example 9 |
|---|---|---|---|---|---|---|
| Modified SBR 1 | HPR355 | 60 | 60 | 60 | 60 | 60 |
| Modified SBR 2 | | — | — | — | — | — |
| Modified SBR 3 | | — | — | — | — | — |
| Non-modified SBR | T3830 | 27.5 | 27.5 | — | — | — |
| Non-modified SBR | SLR6430 | — | — | 22 | 22 | 22 |
| BR | BR150B | 20 | — | — | — | — |
| Nd-BR 1 | CB24 | — | 20 | 24 | 24 | 24 |
| Nd-BR 2 | BR730 | — | — | — | — | — |
| Carbon black | | 5 | 5 | 5 | 5 | 5 |
| Silica | | 80 | 80 | 80 | 80 | 80 |
| Silane coupling agent | | 6.4 | 6.4 | 6.4 | 6.4 | 6.4 |
| Aromatic vinyl polymer | | — | — | — | 2 | 5 |
| Aromatic oil | | 2 | 2 | 3.5 | 3.5 | 3.5 |
| Wax | | 3 | 3 | 3 | 3 | 3 |
| Antioxidant | | 2.5 | 2.5 | 2.5 | 2.5 | 2.5 |
| Stearic acid | | 2.5 | 2.5 | 2.5 | 2.5 | 2.5 |
| Zinc oxide | | 3 | 3 | 3 | 3 | 3 |
| Sulfur | | 1.0 | 1.0 | 1 | 1.0 | 1.0 |
| Vulcanization accelerator NS | | 1.8 | 1.8 | 1.8 | 1.8 | 1.8 |
| Vulcanization accelerator M | | 0.3 | 0.3 | 0.3 | 0.3 | 0.3 |
| Vulcanization accelerator DPG | | 1.5 | 1.5 | 1.5 | 1.5 | 1.5 |
| Total | | 216.5 | 216.5 | 216.5 | 218.5 | 221.5 |
| Acetone-extractable content (%): O | | 8 | 8 | 8 | 8 | 9 |
| Total amount of reinforcing agents (%): F | | 39 | 39 | 39 | 39 | 38 |
| F/O | | 4.9 | 4.9 | 4.9 | 4.9 | 4.2 |
| Tire physical properties | | | | | | |
| Hs | | 69 | 70 | 70 | 70 | 69 |
| E* index | | 106 | 110 | 109 | 108 | 107 |
| Tan$\delta$ index | | 104 | 97 | 98 | 99 | 100 |
| Handling stability (dry handling) | | Good | Excellent | Excellent | Excellent | Good |
| Wet grip performance (wet skid test) | | 100 | 100 | 105 | 107 | 108 |
| Kneading processability | | Excellent | Good | Acceptable | Good | Good |
| Fuel economy | | 104 | 96 | 97 | 97 | 99 |

TABLE 4

|  |  | Comparative Example 3 | Example 11 | Example 12 | Example 13 | Example 14 |
|---|---|---|---|---|---|---|
| Modified SBR 1 | HPR355 | — | — | — | — | — |
| Modified SBR 2 |  | 60 | 60 | 60 | 60 | 60 |
| Modified SBR 3 |  | — | — | — | — | — |
| Non-modified SBR | T3830 | 27.5 | 27.5 | 27.5 | 27.5 | 27.5 |
| Non-modified SBR | SLR6430 | — | — | — | — | — |
| BR | BR150B | 20 | — | — | — | — |
| Nd-BR 1 | CB24 | — | 20 | 20 | — | — |
| Nd-BR 2 | BR730 | — | — | — | 20 | 20 |
| Carbon black |  | 5 | 5 | 5 | 5 | 5 |
| Silica |  | 80 | 80 | 80 | 80 | 80 |
| Silane coupling agent |  | 6.4 | 6.4 | 6.4 | 6.4 | 6.4 |
| Aromatic vinyl polymer |  | — | — | 2 | — | 2 |
| Aromatic oil |  | 12 | 2 | 2 | 2 | 2 |
| Wax |  | 3 | 3 | 3 | 3 | 3 |
| Antioxidant |  | 2.5 | 2.5 | 2.5 | 2.5 | 2.5 |
| Stearic acid |  | 2.5 | 2.5 | 2.5 | 2.5 | 2.5 |
| Zinc oxide |  | 3 | 3 | 3 | 3 | 3 |
| Sulfur |  | 1.4 | 1.0 | 1.0 | 1.0 | 1.0 |
| Vulcanization accelerator NS |  | 1.8 | 1.8 | 1.8 | 1.8 | 1.8 |
| Vulcanization accelerator M |  | 0.3 | 0.3 | 0.3 | 0.3 | 0.3 |
| Vulcanization accelerator DPG |  | 1.5 | 1.5 | 1.5 | 1.5 | 1.5 |
| Total |  | 226.9 | 216.5 | 218.5 | 216.5 | 218.5 |
| Acetone-extractable content (%): O |  | 12 | 8 | 8 | 8 | 8 |
| Total amount of reinforcing agents (%): F |  | 37 | 39 | 39 | 39 | 39 |
| F/O |  | 3.1 | 4.9 | 4.9 | 4.9 | 4.9 |
| Tire physical properties |  |  |  |  |  |  |
| Hs |  | 67 | 70 | 70 | 70 | 70 |
| E* index |  | 100 | 110 | 110 | 110 | 110 |
| Tan$\delta$ index |  | 100 | 97 | 98 | 97 | 98 |
| Handling stability (dry handling) |  | Acceptable | Excellent | Excellent | Excellent | Excellent |
| Abrasion resistance |  | 100 | 106 | 105 | 106 | 106 |
| Fuel economy |  | 100 | 96 | 97 | 96 | 97 |

TABLE 5

|  |  | Comparative Example 4 | Example 15 | Example 16 | Example 17 | Example 18 |
|---|---|---|---|---|---|---|
| Modified SBR 1 | HPR355 | — | — | — | — | — |
| Modified SBR 2 |  | — | — | — | — | — |
| Modified SBR 3 |  | 60 | 60 | 60 | 60 | 60 |
| Non-modified SBR | T3830 | 27.5 | 27.5 | 27.5 | 27.5 | 27.5 |
| Non-modified SBR | SLR6430 | — | — | — | — | — |
| BR | BR150B | 20 | — | — | — | — |
| Nd-BR 1 | CB24 | — | 20 | 20 | — | — |
| Nd-BR 2 | BR730 | — | — | — | 20 | 20 |
| Carbon black |  | 5 | 5 | 5 | 5 | 5 |
| Silica |  | 80 | 80 | 80 | 80 | 80 |
| Silane coupling agent |  | 6.4 | 6.4 | 6.4 | 6.4 | 6.4 |
| Aromatic vinyl polymer |  | — | — | 2 | — | 2 |
| Aromatic oil |  | 12 | 2 | 2 | 2 | 2 |
| Wax |  | 3 | 3 | 3 | 3 | 3 |
| Antioxidant |  | 2.5 | 2.5 | 2.5 | 2.5 | 2.5 |
| Stearic acid |  | 2.5 | 2.5 | 2.5 | 2.5 | 2.5 |
| Zinc oxide |  | 3 | 3 | 3 | 3 | 3 |
| Sulfur |  | 1.4 | 1.0 | 1.0 | 1.0 | 1.0 |
| Vulcanization accelerator NS |  | 1.8 | 1.8 | 1.8 | 1.8 | 1.8 |
| Vulcanization accelerator M |  | 0.3 | 0.3 | 0.3 | 0.3 | 0.3 |
| Vulcanization accelerator DPG |  | 1.5 | 1.5 | 1.5 | 1.5 | 1.5 |
| Total |  | 226.9 | 216.5 | 218.5 | 216.5 | 218.5 |
| Acetone-extractable content (%): O |  | 12 | 8 | 8 | 8 | 8 |
| Total amount of reinforcing agents (%): F |  | 37 | 39 | 39 | 39 | 39 |
| F/O |  | 3.1 | 4.9 | 4.9 | 4.9 | 4.9 |
| Tire physical properties |  |  |  |  |  |  |
| Hs |  | 68 | 71 | 71 | 71 | 71 |
| E* index |  | 100 | 111 | 110 | 111 | 110 |
| Tan$\delta$ index |  | 100 | 97 | 98 | 97 | 98 |

TABLE 5-continued

| | Comparative Example 4 | Example 15 | Example 16 | Example 17 | Example 18 |
|---|---|---|---|---|---|
| Handling stability (dry handling) | Acceptable | Excellent | Excellent | Excellent | Excellent |
| Abrasion resistance | 100 | 106 | 106 | 106 | 106 |
| Fuel economy | 100 | 96 | 97 | 96 | 97 |

As shown in Table 1, the use of modified SBR 1 and Nd-BR 1 or Nd-BR 2 in combination improved the dry handling performance, abrasion resistance, and fuel economy in a balanced manner. As shown in Table 2, the addition of high-styrene SBR of linear polymer type improved the wet grip performance while maintaining those properties. As shown in Table 3, the further addition of an aromatic vinyl polymer remarkably improved the kneading processability and wet grip performance. Also in the case of using modified SBR 2 or modified SBR 3 as the terminally-modified solution-polymerized SBR, the same effects were achieved as in the case of Tables 1 to 3 (see Tables 4 and 5).

The invention claimed is:

1. A pneumatic tire comprising a cap tread formed from a rubber composition comprising:
a rubber component comprising
(a) a terminally-modified solution-polymerized styrene-butadiene rubber which has been modified with a compound represented by the following formula (1):

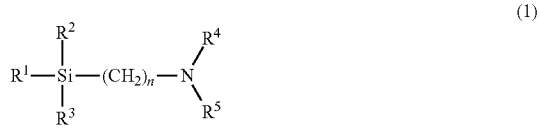

wherein $R^1$, $R^2$, and $R^3$ are the same as or different from each other and each represent a C1- to C4-alkoxy group; $R^4$ and $R^5$ are the same as or different from each other and each represent a hydrogen atom or a C1- to C4-alkyl group; and n represents an integer of 1 to 5,
(b) a butadiene rubber synthesized in the presence of a rare earth catalyst, and
(c) a non-modified styrene-butadiene rubber; and
a reinforcing agent comprising 3 to 15 parts by mass of carbon black having a nitrogen adsorption specific surface area of 90 $m^2$/g to 140 $m^2$/g and 50 to 90 parts by mass of silica having a nitrogen adsorption specific surface area of 150 $m^2$/g to 220 $m^2$/g,
wherein the rubber component of the rubber composition contains, based on 100% by mass of the rubber component, 40 to 70% by mass of the terminally-modified solution-polymerized styrene-butadiene rubber and 10 to 30% by mass of the butadiene rubber synthesized in the presence of a rare earth catalyst.

2. The pneumatic tire according to claim 1,
wherein the rubber component contains, based on 100% by mass of the rubber component, 10 to 40% by mass of non-modified styrene-butadiene rubber (c), which has a styrene content of 20% by mass or more, a weight average molecular weight (Mw) of 800,000 or more, and a ratio of weight average molecular weight to number average molecular weight (Mw/Mn) of 0.9 to 2.5.

3. The pneumatic tire according to claim 1, comprising, per 100 parts by mass of the rubber component,
1 to 8 parts by mass of an aromatic vinyl polymer polymerized from at least one of α-methylstyrene and styrene.

4. The pneumatic tire according to claim 1,
wherein an amount of the reinforcing agent and an acetone-extractable content satisfy the following relation:

3.0≤[(the amount of the reinforcing agent)/
(the acetone-extractable content)]≤10.0.

* * * * *